(12) United States Patent
Stringer (10) Patent No.: US 7,058,938 B2
(45) Date of Patent: Jun. 6, 2006

(54) METHOD AND SYSTEM FOR SCHEDULING SOFTWARE PIPELINED LOOPS

(75) Inventor: Lynd M. Stringer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 10/382,242

(22) Filed: Mar. 5, 2003

(65) Prior Publication Data

US 2004/0177351 A1     Sep. 9, 2004

(51) Int. Cl.
    *G06F 9/45*     (2006.01)
(52) U.S. Cl. .............. 717/161; 717/149; 717/150; 717/151; 717/160; 712/237; 712/241
(58) Field of Classification Search .............. 717/150, 717/156–159, 160–161, 137, 144, 149, 151, 717/140; 712/228, 233–234, 241, 237; 710/305; 711/213
See application file for complete search history.

(56) References Cited

U.S. PATENT DOCUMENTS

| | | | | |
|---|---|---|---|---|
| 5,652,889 A * | 7/1997 | Sites | .......................... | 717/144 |
| 5,694,568 A * | 12/1997 | Harrison et al. | ............. | 711/213 |
| 5,721,865 A * | 2/1998 | Shintani et al. | ............. | 711/137 |
| 5,742,804 A * | 4/1998 | Yeh et al. | .................... | 712/237 |
| 5,889,985 A * | 3/1999 | Babaian et al. | ............. | 712/225 |
| 6,061,786 A * | 5/2000 | Witt | ............................ | 712/237 |
| 6,077,311 A * | 6/2000 | Lichtenstein et al. | ....... | 717/128 |
| 6,341,370 B1 * | 1/2002 | Tirumalai et al. | ........... | 717/141 |
| 6,539,541 B1 * | 3/2003 | Geva | .......................... | 717/150 |
| 6,609,249 B1 * | 8/2003 | Kunz et al. | ................. | 717/161 |
| 6,651,247 B1 * | 11/2003 | Srinivasan | ................... | 717/161 |
| 6,751,696 B1 * | 6/2004 | Farmwald et al. | .......... | 710/305 |
| 6,820,173 B1 * | 11/2004 | Bittel et al. | ................. | 711/137 |
| 6,820,250 B1 * | 11/2004 | Muthukumar et al. | ...... | 717/116 |
| 6,826,677 B1 * | 11/2004 | Topham | ...................... | 712/217 |
| 6,889,319 B1 * | 5/2005 | Rodgers et al. | ............. | 712/228 |
| 6,892,380 B1 * | 5/2005 | Granston et al. | ........... | 717/160 |

OTHER PUBLICATIONS

TITLE: Instruction fetch unit for parallel execution of branch instructions, author: Gonzalez et al, ACM, 1989.*
TITLE: Cooperative Prefetching: Compiler and Hardware Support for Effective Instruction Prefetching in Modern Processors, author: Luk et al, IEEE, 1998.*
TITLE: A Instruction Fetch Unit for A Graph Reduction Machine, author: Thakkar et al, IEEE, 1986.*
TITLE: A Performance Study of Instruction Cache Prefetching Methods, author: Hsu et al, IEEE, 1998.*

* cited by examiner

*Primary Examiner*—Chameli C. Das
(74) *Attorney, Agent, or Firm*—Marshall, Gerstein & Borun LLP (57) ABSTRACT

A method and a system for scheduling a software pipelined loop with indirect loads. The system may include a data structure in communication with a processor and a memory. The processor may determine a condition associated with a potential for saturation of the data structure. Accordingly, the processor may provide a number of instructions associated with the software pipelined loop from the memory to a queue of the data structure prior to processing of the instructions by the processor based on the condition associated with a potential for saturation of the data structure.

19 Claims, 5 Drawing Sheets

FIG.1

| STAGE 1 | STAGE 2 | STAGE 3 | STAGE 4 | STAGE 5 | STAGE 6 | STAGE 7 | STAGE 8 | STAGE 9 | STAGE 10 |
|---|---|---|---|---|---|---|---|---|---|
| CYCLE 1 ⌒202 LOAD INDEX(1) | CYCLE 5 ⌒212 LOAD INDEX(2) | CYCLE 9 ⌒222 LOAD INDEX(3) | CYCLE 13 ⌒232 LOAD INDEX(4) | CYCLE 17 ⌒242 LOAD INDEX(5) | CYCLE 21 ⌒252 LOAD INDEX(6) | CYCLE 25 ⌒262 LOAD INDEX(7) | CYCLE 29 ⌒272 LOAD INDEX(8) | CYCLE 33 ⌒282 LOAD INDEX(9) | CYCLE 37 ⌒292 LOAD INDEX(10) |
| CYCLE 2 ⌒204 LOAD b(index (0)) (i.e., no-op) | CYCLE 6 ⌒214 LOAD b(index (1)) | CYCLE 10 ⌒224 LOAD b(index (2)) | CYCLE 14 ⌒234 LOAD b(index (3)) | CYCLE 18 ⌒244 LOAD b(index (4)) | CYCLE 22 ⌒254 LOAD b(index (5)) | CYCLE 26 ⌒264 LOAD b(index (6)) | CYCLE 30 ⌒274 LOAD b(index (7)) | CYCLE 34 ⌒284 LOAD b(index (8)) | CYCLE 38 ⌒294 LOAD b(index (9)) |
| CYCLE 3 ⌒206 STORE a(-1) (i.e., no-op) | CYCLE 7 ⌒216 STORE a(0) (i.e., no-op) | CYCLE 11 ⌒226 STORE a(1) | CYCLE 15 ⌒236 STORE a(2) | CYCLE 19 ⌒246 STORE a(3) | CYCLE 23 ⌒256 STORE a(4) | CYCLE 27 ⌒266 STORE a(5) | CYCLE 31 ⌒276 STORE a(6) | CYCLE 35 ⌒286 STORE a(7) | CYCLE 39 ⌒296 STORE a(8) |
| CYCLE 4 ⌒208 BRANCH | CYCLE 8 ⌒218 BRANCH | CYCLE 12 ⌒228 BRANCH | CYCLE 16 ⌒238 BRANCH | CYCLE 20 ⌒248 BRANCH | CYCLE 24 ⌒258 BRANCH | CYCLE 28 ⌒268 BRANCH | CYCLE 32 ⌒278 BRANCH | CYCLE 36 ⌒288 BRANCH | CYCLE 40 ⌒298 BRANCH |

FIG. 2

| | STAGE 1 | STAGE 2 | STAGE 3 | STAGE 4 | STAGE 5 | STAGE 6 | STAGE 7 | STAGE 8 | STAGE 9 | STAGE 10 |
|---|---|---|---|---|---|---|---|---|---|---|
| | CYCLE 1<br>302<br>LOAD<br>INDEX(1) | CYCLE 5<br>312<br>LOAD<br>INDEX(2) | CYCLE 9<br>322<br>LOAD<br>INDEX(3) | CYCLE 13<br>332<br>LOAD<br>INDEX(4) | CYCLE 17<br>342<br>LOAD<br>INDEX(5) | CYCLE 21<br>352<br>LOAD<br>INDEX(6) | CYCLE 25<br>362<br>LOAD<br>INDEX(7) | CYCLE 29<br>372<br>LOAD<br>INDEX(8) | CYCLE 33<br>382<br>LOAD<br>INDEX(9) | CYCLE 37<br>392<br>LOAD<br>INDEX(10) |
| | CYCLE 2<br>304<br>LOAD<br>b(index (0))<br>(i.e., no-op) | CYCLE 6<br>314<br>LOAD<br>b(index (1)) | CYCLE 10<br>324<br>LOAD<br>b(index (2)) | CYCLE 14<br>334<br>LOAD<br>b(index (3)) | CYCLE 18<br>344<br>LOAD<br>b(index (4)) | CYCLE 22<br>354<br>LOAD<br>b(index (5)) | CYCLE 26<br>364<br>LOAD<br>b(index (6)) | CYCLE 30<br>374<br>LOAD<br>b(index (7)) | CYCLE 34<br>384<br>LOAD<br>b(index (8)) | CYCLE 38<br>394<br>LOAD<br>b(index (9)) |
| | CYCLE 3<br>306<br>STORE<br>a(-2)<br>(i.e., no-op) | CYCLE 7<br>316<br>STORE<br>a(-1)<br>(i.e., no-op) | CYCLE 11<br>326<br>STORE<br>a(0)<br>(i.e., no-op) | CYCLE 15<br>336<br>STORE<br>a(1) | CYCLE 19<br>346<br>STORE<br>a(2) | CYCLE 23<br>356<br>STORE<br>a(3) | CYCLE 27<br>366<br>STORE<br>a(4) | CYCLE 31<br>376<br>STORE<br>a(5) | CYCLE 35<br>386<br>STORE<br>a(6) | CYCLE 39<br>396<br>STORE<br>a(7) |
| | CYCLE 4<br>308<br>BRANCH | CYCLE 8<br>318<br>BRANCH | CYCLE 12<br>328<br>BRANCH | CYCLE 16<br>338<br>BRANCH | CYCLE 20<br>348<br>BRANCH | CYCLE 24<br>358<br>BRANCH | CYCLE 28<br>368<br>BRANCH | CYCLE 32<br>378<br>BRANCH | CYCLE 36<br>388<br>BRANCH | CYCLE 40<br>398<br>BRANCH |

FIG. 3

| STAGE 1 | STAGE 2 | STAGE 3 | | STAGE n-3 | STAGE n-2 | STAGE n-1 | STAGE n |
|---|---|---|---|---|---|---|---|
| LOAD b(1) | LOAD b(2) | LOAD b(3) | | LOAD b(n-3) | LOAD b(n-2) | LOAD b(n-1) | LOAD b(n) |
| NO-OP | SUM b(1) | SUM b(2) | | SUM b(n-4) | SUM b(n-3) | SUM b(n-2) | SUM b(n-1) |
| NO-OP | NO-OP | STORE a(1) | | STORE a(n-5) | STORE a(n-4) | STORE a(n-3) | STORE a(n-2) |
| BRANCH | BRANCH | BRANCH | | BRANCH | BRANCH | BRANCH | BRANCH |

METHOD AND SYSTEM FOR SCHEDULING SOFTWARE PIPELINED LOOPS

TECHNICAL FIELD

The present disclosure relates generally to memory systems, and more particularly, to a method and a system for scheduling software pipelined loops.

BACKGROUND

Typically, a processor is capable of handling more than one instruction at a time. That is, the instructions are fetched into a cache. By placing the instructions in the cache in a particular manner, the processor may perform software pipelining to overlap loop iterations. A software-pipelined loop iteration is partitioned into stages with one or more instructions.

Software pipelined loops are scheduled with indirect loads by retrieving the data for load instructions from a memory into a cache prior to processing the load instructions (i.e., pre-fetch). If the data for the load instructions is not pre-fetched into the cache, the processor may stall by waiting for the data to be fetched from the memory into the cache. As a result, performance of the loop is reduced. Alternatively, the indirect loads may be software pipelined with the expectation that the data is in the cache. If the data is in-cache (i.e., without pre-fetch), the additional instructions for the pre-fetches of data, the address calculations, and the loads from the index array increase the cycles per iteration of the loop, which in turn, reduce performance of the loop. Typically before execution, the compiler of the processor may predetermine whether to pre-fetch the data of the indirect loads into the cache.

Therefore, a need exists to perform software pipelining without pre-fetching data for an instruction and regardless of whether the data is in either the memory or the cache.

BRIEF DESCRIPTION OF THE DRAWINGS

This disclosure will describe several embodiments to illustrate its broad teachings. Reference is also made to the attached drawings.

DETAILED DESCRIPTION

A method and a system for scheduling a software pipelined loop are described herein. In particular, the system may include a data structure in communication with a processor and a memory. The processor may determine the capacity of a data structure. The processor may also provide a number of instructions associated with the software pipelined loop from the memory into a queue of the data structure prior to processing of the instructions. That is, the processor may provide as many instructions to fill the data structure to its capacity. By saturating the data structure with instructions, the system may operate at an optimal level without pre-fetching data associated with the instructions.

Figure 1:
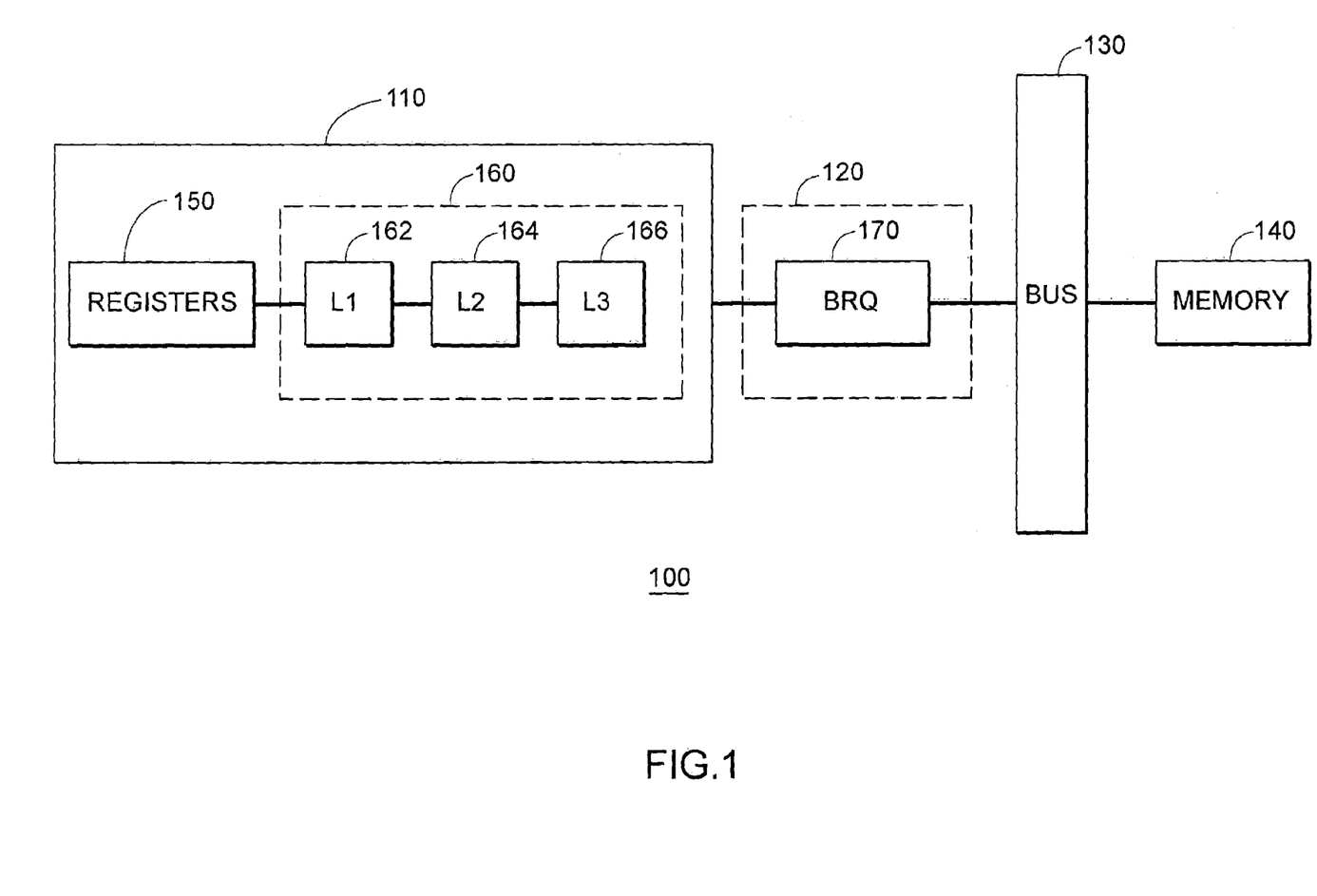
FIG. 1 is a block diagram representation of a computer system.

Referring to FIG. 1, a computer system 100 generally includes a processor 110, a data structure 120, a bus 130, and a memory 140. The processor 110 may include, but is not limited to, a plurality of registers 150 and a cache 160. The cache 160, for example, may include a level 1 (L1) cache 162, a level 2 (L2) cache 164, and a level 3 (L3) cache 166 as persons of ordinary skill in the art will readily recognize. The processor 110 and the bus 130 may be configured to communicate with each other via the data structure 120. That is, the data structure 120 such as a front side bus (FSB) is a data path and a physical interface between the memory 140 and the cache 160. The data structure 120 may include a bus request queue (BRQ) 170 configured to store instructions of a loop.

A basic flow for scheduling a software pipelined loop with the computer system 100 shown in FIG. 1 may start with a compiler (not shown) of the processor 110 determining the capacity of the data structure 120. The capacity of the data structure 120 may be a condition associated with a potential for saturation of the data structure 120. Based on the capacity of the data structure 120, the compiler of the processor 110 may provide a number of load instructions to the bus request queue 170 of the data structure 120 prior to processing of the number of instructions by the processor 110. The number of instructions may be a number of load instructions to fill the data structure 120 to its capacity (i.e., to saturate the data structure 120). As a result, the performance of the computer system 100 may be optimized.

Figure 2:
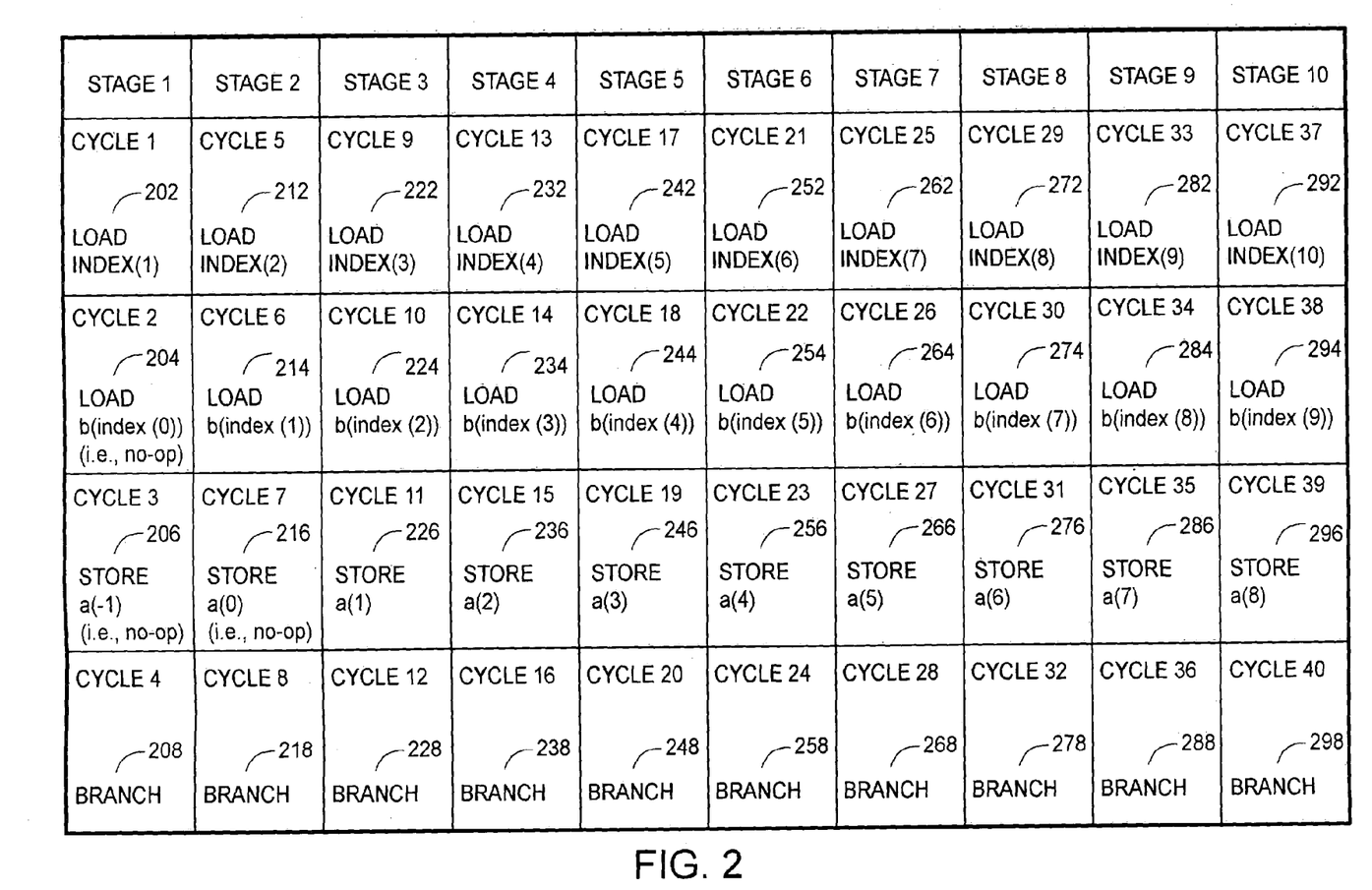
FIG. 2 is a flow diagram representation of a software pipelined loop.

Referring to FIG. 2, for example, a loop such as a(i)=b (index(i)) for i=1 to n may be distributed into stages of the loop as persons of ordinary skill in the art will readily recognize (i.e., partitioned into iterations of the loop). Here, b(index(i)) is an indexed load. One instruction may be issued per cycle with a latency of two cycles except for a branch instruction (i.e., return to the load instruction). In particular, Stage 1 (i.e., the first iteration of the loop) may include the instructions of load index(1) 202 at cycle 1, load b(index(0)) 204 at cycle 2, store a(−1) 206 at cycle 3, and branch 208 to top of the loop at cycle 4. When the index is either a zero or a negative number, the instruction is predicated off (i.e., a null instruction or a non-operation). In Stage 1, for example, instructions of load b(index(0)) 204 and store a(−1) 206 may be null instructions (shown as "no-op"). Another example of a "no-op" may be the instruction of store a(0) 216 in Stage 2. Stage 1 may be followed by Stage 2 (i.e., the second iteration of the loop), which includes the instructions of load index(2) 212 at cycle 5, load b(index(1)) 214 at cycle 6, store a(0) 216 at cycle 7, and branch 218 to top of the loop at cycle 8. Instructions in Stage 3 through Stage 10 may be processed in a similar fashion. For illustrative purposes, the loop is partitioned up to Stage 10 but persons of ordinary skill in the art will readily recognize that the loop may be partitioned to any number of stages.

The processor 110 may execute the instructions of the loop in order as shown in FIG. 2. For example, the processor 110 may execute the instruction of load index(1) 202 at cycle 1, and then instructions of load b(index(0)) 204 at cycle 2, store a(−1) 206 at cycle 3 and branch 208 to top of the loop at cycle 4 in Stage 1 prior to the next load instruction of load index (2) 212 at cycle 5. In another example, the processor 110 may execute the instruction of load index(8) 272 at cycle 29 and then load b(index(7)) 274 at cycle 30, store a(6) 276 at cycle 31 and branch 278 to top of the loop at cycle 32 in Stage 8 prior to the next load instruction of load index(9) 282 at cycle 33. However, the latency of each instruction of a loop (i.e., the number of clock cycles to process the instruction) may stall the processor 110. For example, each load instruction (generally shown as load b(index(1)) 204 through load b(index(10)) 294) may include a latency of five (5) cycles. That is, the compiler of the processor 110 may delay the first use of the data loaded by a load instruction (e.g., a store instruction with one shown as store a(1) 226 at cycle 11). The compiler of the processor 110 may determine the latency of each instruction of the loop by retrieving such information from a table stored in the memory 140 as persons of ordinary skill in the art will readily recognize. As a result, the compiler of the processor 110 may schedule instructions of the software pipelined loop into a minimum number of stages such that the latency of each instruction is met or exceeded.

Initially, the compiler (not shown) of the processor 110 may determine whether to pre-fetch data of an instruction from the memory 140 into the cache 160. If the data is stored in the memory 140 then the compiler may instruct the processor 110 to pre-fetch the data from the memory 140 into the cache 160 prior to the processor 110 executing the instruction. For example, the compiler may instruct the processor 110 to pre-fetch the data of b(index(1)) from the memory 140 into the cache 160 prior to the instruction of load b(index(1)) 204. However, the processor 110 may stall by waiting for the data to be retrieved from the memory 140 into the cache 160. Alternatively, if the data is stored in the cache 160 then the compiler may not instruct the processor 110 to pre-fetch the data. However, the additional instructions for pre-fetches, address calculations, and loads from the index array may increase the cycles per stage of the loop, which in turn, reduces the performance of the computer system 100. By providing a number of instructions to the bus request queue 170 of the data structure 120 prior to processing of the number of instructions by the processor 110, the loop may be software pipelined without pre-fetched instructions (i.e., whether the data is in either the memory or the cache is a non-factor in processing the instructions).

Figure 3:
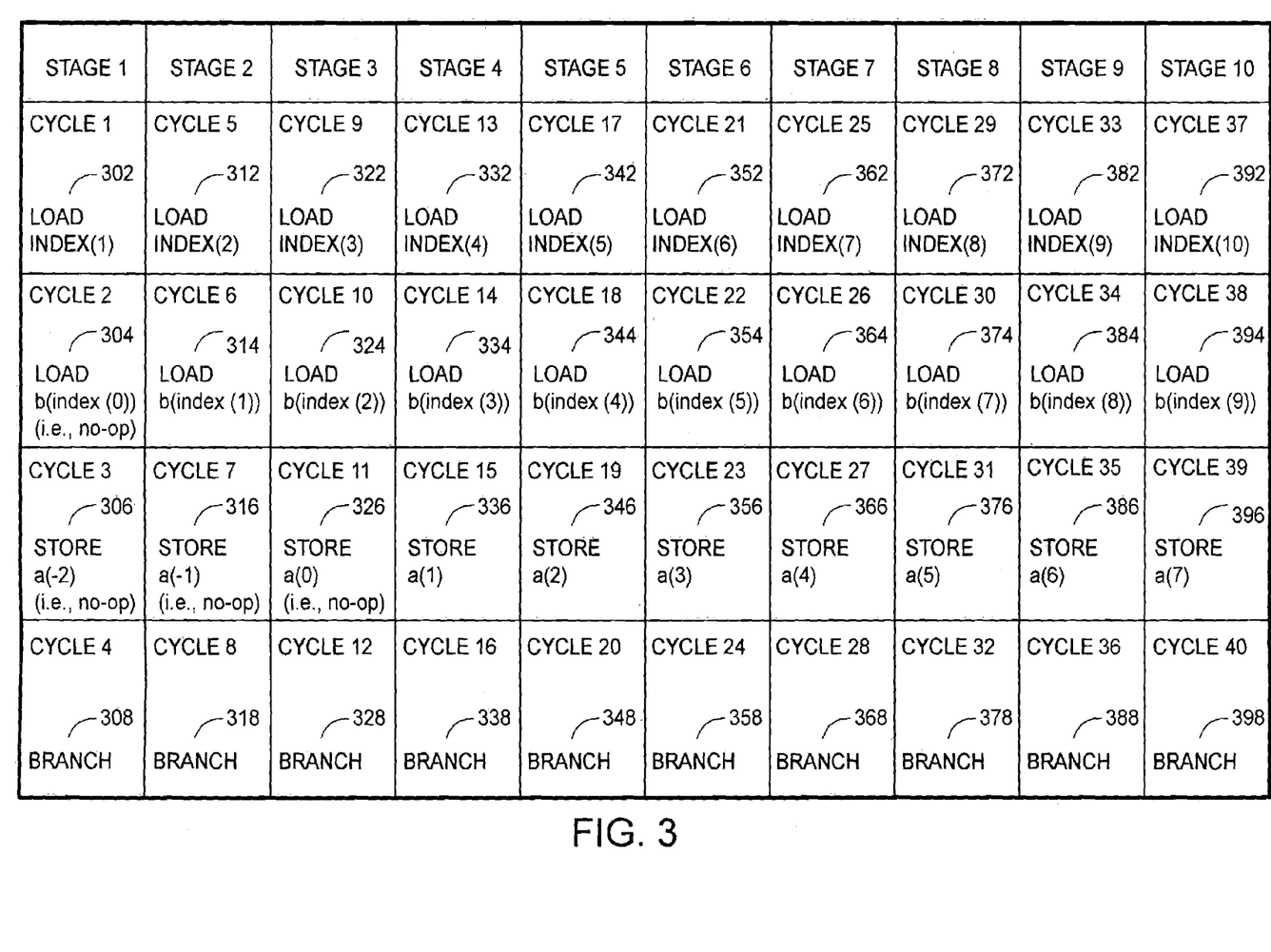
FIGS. 3 and 4 are flow diagram representations of software pipeline loops with indirect loads.

Following the discussion on FIG. 2, the loop may be partitioned into different stages as shown in FIG. 3. To optimize the data structure 120, the loop may be software pipelined by providing a number of load instructions into the BRQ 170 to saturate the data structure 120 (i.e., to fill the data structure 120 to its capacity with load instructions). Additional constraint may be included into the scheduling of instructions of the software pipelined loop such that the number of indexed load instructions may saturate the data structure 120 prior to the use of the indexed load instructions. That is, additional stages may be added to the loop. In particular, the processor 110 may issue a number of load instructions before the first use of those load instructions (i.e., indirect loads). Accordingly, the instructions may be processed in different stages (i.e., load instruction is processed in one stage while the store instruction is processed in another stage). For example, the processor 110 may schedule three load instructions including load b(index(1)) 314 at cycle 6, load b(index(2)) 324 at cycle 10, and load b(index(3)) 334 at cycle 14 into the BRQ 170 before their first use starting in Stage 4 with store a(1) 336 at cycle 15 because each load instruction has a latency of nine (9) cycles. Accordingly, instructions of load b(index(2)) 324 and load b(index(3)) 334 may be first used in Stage 5 with store a(2) 346 at cycle 19 and Stage 6 with store a(3) at cycle 23, respectively. To illustrate this concept, Stage 1 may include the load index instruction of load index(1) 302 at cycle 1, a load instruction of load b(index(0)) 304 at cycle 2, a null instruction of no-op 304 at cycle 3, and an instruction to branch 306 to top of the loop at cycle 4. Likewise, Stage 2 may include the load index instruction of load index(2) 312 at cycle 5, a load instruction of load b(index(1)) 314 at cycle 7, a null instruction of no-op 316 at cycle 7, and an instruction to branch 318 to the top of the loop at cycle 8. Stage 3 may include the load index instruction of load index(3) 322 at cycle 9, a load instruction of load b(index (2)) 324 at cycle 10, a null instruction of no-op 326 at cycle 11, and an instruction to branch 328 to top of the loop at cycle 12. However, Stage 4 may include the load index instruction of load index(4) 332 at cycle 13, a load instruction of load b(index(3)) 334 at cycle 14, a store instruction of store a(1) 336 at cycle 15, and an instruction to branch 338 to top of the loop at cycle 16. In a similar fashion, Stage 5 through Stage 10 may include a load index instruction, a load instruction, a store instruction, and an instruction to branch to top of the loop. As a result, each of the store instructions may be processed nine cycles after its respective load instruction. For example, the store instructions of store a(1) 336, store a(2) 346, and store a(3) 356 may be processed nine cycles at cycle 15, cycle 19, and cycle 23, respectively, after its corresponding load instruction (i.e., load b(index(1)) 314 at cycle 6, load b(index(2)) 324 at cycle 10, and load b(index(3)) 334 at cycle 14, respectively). Further, the stage in which the store instruction is executed is based on the latency of the load instruction. For example, the load instruction of load b(index(1)) 314 may be executed by the processor 110 at cycle 6 of Stage 2 but the corresponding store instruction of store a(1) 336 may be executed by the processor 110 at cycle 15 of Stage 4. In another example, the load instruction of load b(index(3)) 334 may be executed by the processor 110 at cycle 14 of Stage 3 while the corresponding store instruction of store a(3) 356 may be executed by the processor 110 at cycle 23 of Stage 6. Regardless of whether the compiler may instruct the processor 110 to pre-fetch the data, the performance of the computer system 100 may be optimized by the number of indirect loads in the data structure 120 (i.e., in the BRQ 170).

Figure 4:
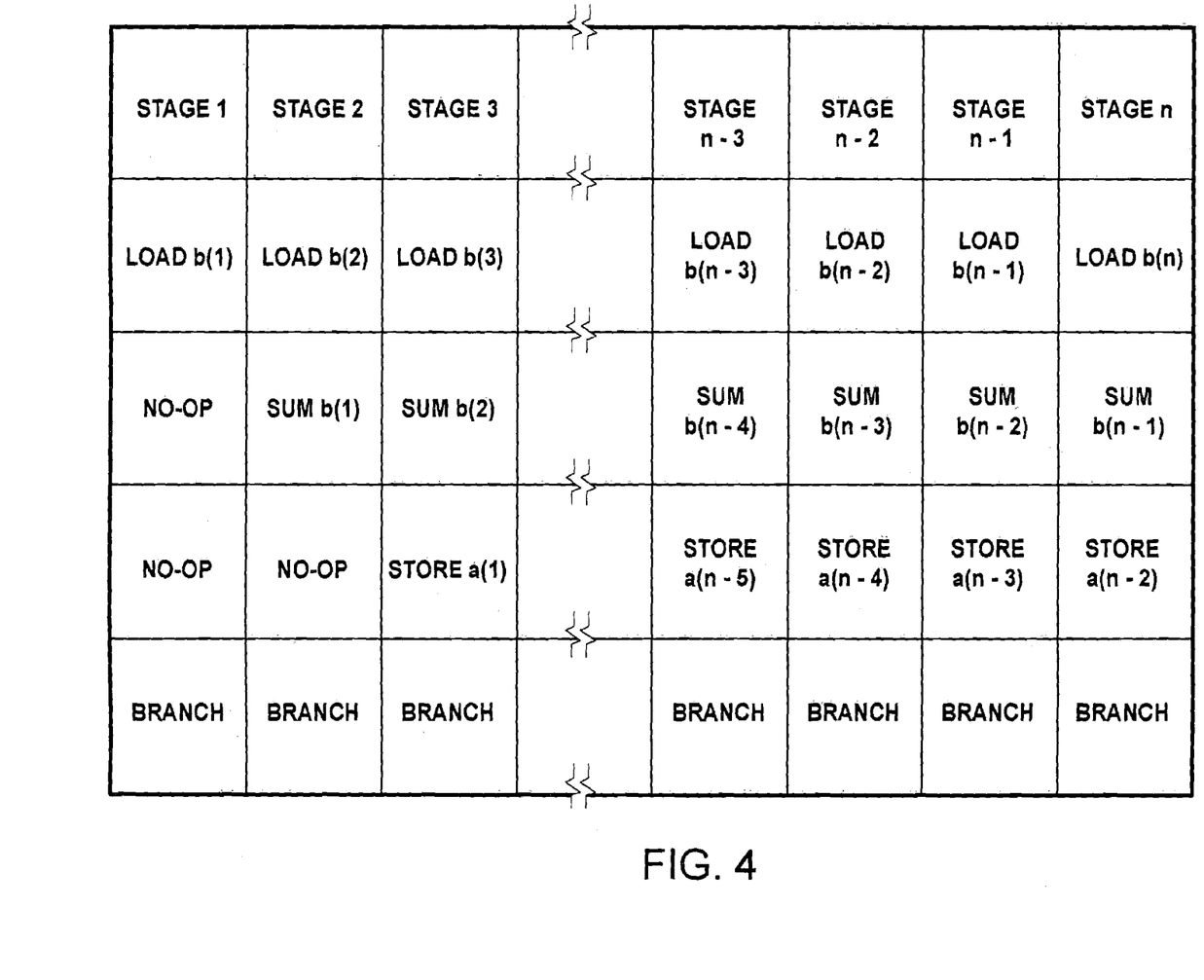

Although a particular number of indirect instructions and particular types of instructions of the loop are illustrated in FIG. 3, persons of ordinary skill in the art will readily appreciate that the method and the system disclosed herein can schedule software pipelined loops having other numbers of indirect instructions and/or types of instructions of a software pipelined loop. Persons of ordinary skill in the art will readily appreciate that the teachings of this disclosure can be employed to include instructions such as sum instructions as shown in FIG. 4.

Figure 5:
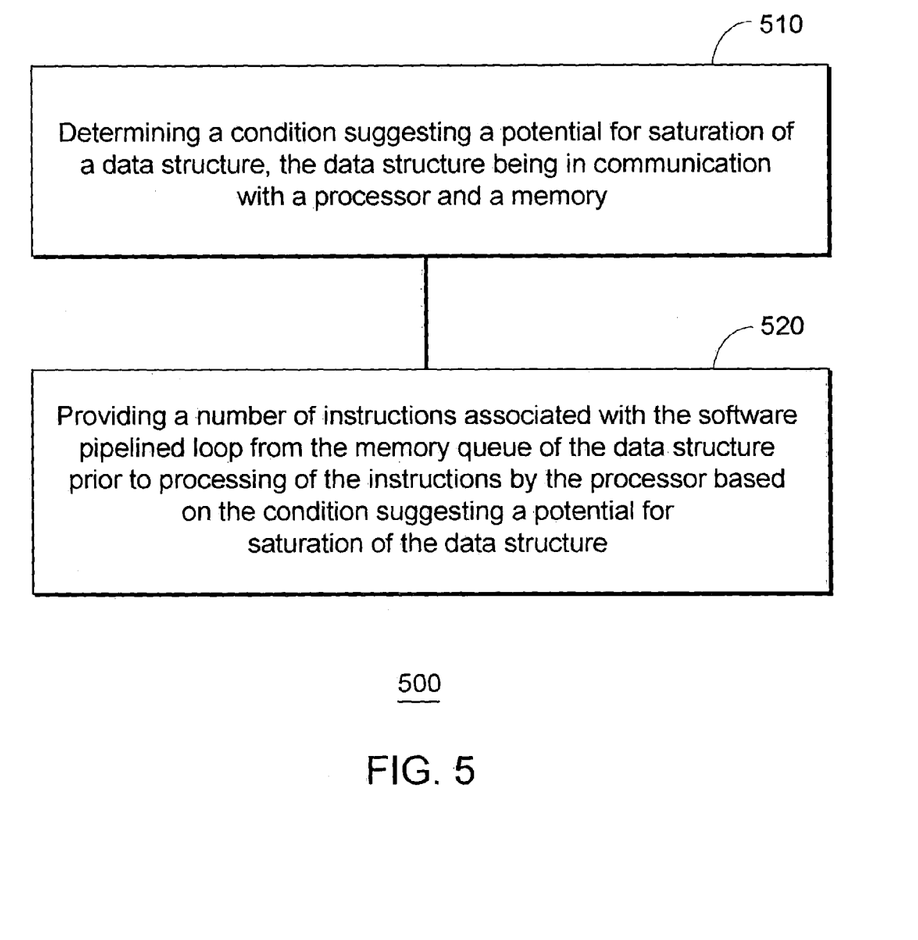
FIG. 5 is a flow diagram illustrating a method for scheduling a software pipelined loop.

One possible implementation of the computer program executed by the computer system 100 is illustrated in FIG. 5. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 5, persons of ordinary skill in the art will appreciate that these steps can be performed in other temporal sequences. Again, the flow chart 500 is merely provided as an example of one way to program the computer system 100 (e.g., the compiler of the processor 110) to schedule software pipelined loops with indirect loads. The flow chart 500 begins at step 510, wherein the computer system 100 is programmed to determine the capacity of a data structure such as a front side bus. A processor may be operatively coupled to a bus and a memory via the data structure (e.g., as shown in FIG. 1). Accordingly, the processor, the bus, and the memory may be configured to communicate with each other via the data structure. At step 520, the processor may provide a number of indirect loads from the memory into a queue of the data structure prior to processing of the number of indirect loads by the processor 110. To optimize the data structure, the processor may provide as many indirect loads to 110 saturate the data structure (i.e., fill the data structure with indirect loads to its capacity). As a result, the computer system 100 may schedule a software pipelined loop without pre-fetching instructions of the loop and regardless of whether the data for the instructions is in either the memory or the cache of the computer system 100.

Although the method and the system disclosed herein are particularly well suited for compiler technology, persons of ordinary skill in the art will readily appreciate that the teachings herein are in no way limited to such technology. On the contrary, persons of ordinary skill in the art will readily appreciate that the teachings of this disclosure can be employed with other memory systems.

Many changes and modifications to the embodiments described herein could be made. The scope of some changes is discussed above. The scope of others will become apparent from the appended claims.

What is claimed is:

1. A method for scheduling a software pipelined loop, the method comprising:
   determining a condition associated with a potential for saturation of a data structure, the data structure being in communication with a processor and a memory; and
   providing a number of instructions associated with the software pipelined loop from the memory to a queue of the data structure prior to processing of the instructions by the processor based on the condition associated with a potential for saturation of the data structure without pre-fetching the number of instructions into a processor cache.

2. The method of claim 1, wherein the steps of determining a condition associated with a potential for saturation of a data structure comprises determining a condition of the database suggesting a potential for saturation in response to receipt of a number of instructions of the software pipelined loop.

3. The method of claim 1, wherein the step of determining a condition associated with a potential for saturation of a data structure comprises determining a condition associated with a potential for saturation of a front side bus.

4. The method of claim 1, wherein the step of providing a number of instructions associated with the software pipelined loop from the memory into a queue of the data structure prior to processing of the instructions by the processor based on the condition associated with a potential for saturation of the data structure comprises providing a number of load instructions associated with the software pipelined loop from the memory into a queue of the data structure prior to processing of the load instructions by the processor based on the condition associated with a potential for saturation of the data structure.

5. The method of claim 1, wherein the step of providing a number of instructions associated with the software pipelined loop from the memory to a queue of the data structure prior to processing of the number of instructions by the processor based on the condition associated with a potential for saturation of the data structure comprises providing a number of instructions associated with a software pipelined loop from the memory to a bus request queue within a front side bus prior to processing of the number of instructions by the processor based on the condition associated with a potential for saturation of the data structure.

6. A system for scheduling a software pipelined loop, the system comprising:
   a memory;
   a bus operatively coupled to the memory;
   a data structure operatively coupled to the bus, the data structure having a queue;
   a processor operatively coupled to the data structure, the processor having register and a cache;
   the processor being programmed to determine a condition associated with a potential for saturation of a data structure, the data structure being in communication with a processor and a memory;
   the processor being programmed to provide a number of instructions associated with the software pipelined loop from the memory to the queue of the data structure prior to processing of the instructions by the processor based on the condition associated with a potential for saturation of the data structure; and
   the processor being programmed to provide the number of instructions associated with the software pipelined loop without pre-fetching the number of instructions into a processor cache.

7. The system of claim 6, wherein the data structure comprises a front side bus.

8. The system of claim 6, wherein the queue comprises a bus request queue within a front side bus.

9. The system of claim 6, wherein the number of instructions comprises a number of load instructions.

10. The system of claim 6, wherein a condition associated with a potential for saturation of the data structure is based on the capacity of the data structure to store instructions of the software pipelined loop.

11. In a communication system, wherein a processor operates in accordance with a computer program embodied on a computer-readable medium for scheduling a software pipelined loop, the computer program comprising:
    a first routine that directs the processor to determine a condition associated with a potential for saturation of a data structure, the data structure being in communication with a processor and a memory; and
    a second routine that directs the processor to provide a number of instructions associated with the software pipelined loop from the memory to a queue of the data structure prior to processing of the instructions by the processor based on the condition associated with a potential for saturation of the data structure;
    wherein the second routine does not include pre-fetching the number of instructions into a processor cache.

12. The computer program of claim 11, wherein the first routine comprises a routine that directs the processor to determine a condition of the database suggesting a potential for saturation in response to receipt of a number of instructions of the software pipelined loop.

13. The computer program of claim 11, wherein the first routine comprises a routine that directs the processor to determine a condition associated with a potential for saturation of a front side bus.

14. The computer program of claim 11, wherein the second routine comprises a routine that directs the processor to provide a number of load instructions associated with the software pipelined loop from the memory into a queue of the data structure-prior to processing of the load instructions by the processor based on the condition associated with a potential for saturation of the data structure.

15. The computer program of claim 11, wherein the second routine comprises a routine that directs the processor to provide a number of instructions associated with a software pipelined loop from the memory to a bus request queue within a front side bus prior to processing of the number of instructions by the processor based on the condition associated with a potential for saturation of the data structure.

16. The computer program of claim 11, wherein the medium comprises one of paper, a programmable gate array, application specific integrated circuit, erasable programmable read only memory, read only memory, random access memory, magnetic media, and optical media.

17. A method for scheduling a software pipelined loop, the method comprising:
   determining the capacity of a data structure, the data structure being in communication with a processor and a memory; and
   storing in the data structure, a number of indirect loads from the memory without pre-fetching the number of indirect loads into a processor cache, the indirect loads being associated with the software pipelined loop and the number of indirect loads being based on the capacity of the data structure.

18. The method of claim 17, wherein the step of determining the capacity of the data structure comprises determining the capacity of a front side bus.

19. The method of claim 17, wherein the step of storing in the data structure a number of indirect loads from the memory without pre-fetching the number of indirect loads into a processor cache the indirect loads being associated with the software pipelined loop comprises storing in a bus request queue of the data structure a number of indirect loads from the memory, the indirect loads being associated with the software pipelined loop.

* * * * *

UNITED STATES PATENT AND TRADEMARK OFFICE
CERTIFICATE OF CORRECTION

| | | |
|---|---|---|
| PATENT NO. | : 7,058,938 B2 | Page 1 of 1 |
| APPLICATION NO. | : 10/382242 | |
| DATED | : June 6, 2006 | |
| INVENTOR(S) | : Lynd M. Stringer | |

It is certified that error appears in the above-identified patent and that said Letters Patent is hereby corrected as shown below:

At Column 6, line 65, "structure- prior" should be --structure prior--.

Signed and Sealed this

Ninth Day of January, 2007

JON W. DUDAS
*Director of the United States Patent and Trademark Office*